United States Patent
Battlogg et al.

(12) 
(10) Patent No.: US 8,408,370 B2
(45) Date of Patent: Apr. 2, 2013

(54) ENERGY ABSORBING ELEMENT

(75) Inventors: Stefan Battlogg, St. Anton/Montafon (AT); Jürgen Pösel, Bludenz (AT)

(73) Assignee: Inventus Engineering GmbH, St. Anton/Montafon (AT)

( * ) Notice: Subject to any disclaimer, the term of this patent is extended or adjusted under 35 U.S.C. 154(b) by 152 days.

(21) Appl. No.: 12/137,944

(22) Filed: Jun. 12, 2008

(65) Prior Publication Data
US 2008/0245627 A1 Oct. 9, 2008

Related U.S. Application Data

(63) Continuation of application No. PCT/AT2006/000506, filed on Dec. 7, 2006.

(30) Foreign Application Priority Data

Dec. 12, 2005 (EP) .................................... 05027070

(51) Int. Cl.
F16F 9/53 (2006.01)
(52) U.S. Cl. ..................... 188/267.2; 188/267; 188/374; 280/775; 280/777
(58) Field of Classification Search .................. 280/775, 280/777; 188/267.2, 267, 374
See application file for complete search history.

(56) References Cited

U.S. PATENT DOCUMENTS

| | | | |
|---|---|---|---|
| 2,997,325 A | 8/1961 | Peterson | |
| 3,656,366 A * | 4/1972 | Somero | 74/492 |
| 4,019,403 A * | 4/1977 | Kondo et al. | 74/492 |
| 4,255,986 A | 3/1981 | Mukoyama | |
| 5,419,581 A | 5/1995 | Schäfer et al. | |
| 5,449,199 A | 9/1995 | Heinrichs et al. | |
| 5,788,278 A | 8/1998 | Thomas et al. | |
| 5,870,930 A * | 2/1999 | Willett et al. | 74/492 |
| 6,027,664 A | 2/2000 | Weiss et al. | |
| 6,203,105 B1 | 3/2001 | Rhodes, Jr. | |
| 6,234,528 B1 | 5/2001 | Ben-Rhouma et al. | |
| 6,296,280 B1 | 10/2001 | Struble et al. | |
| 6,437,687 B2 | 8/2002 | Spencer | |
| 6,514,001 B1 | 2/2003 | Yezersky et al. | |
| 6,641,167 B2 | 11/2003 | Riefe et al. | |
| 6,679,135 B1 * | 1/2004 | Faigle et al. | 74/512 |
| 6,749,045 B2 | 6/2004 | Rosenfeldt et al. | |
| 6,824,211 B2 | 11/2004 | Bayer et al. | |
| 7,048,305 B2 * | 5/2006 | Muller | 280/775 |
| 7,165,786 B1 | 1/2007 | Sha et al. | |
| 7,264,271 B2 * | 9/2007 | Barvosa-Carter et al. | 280/751 |

(Continued)

FOREIGN PATENT DOCUMENTS

DE 69313273 T2 12/1997
DE 19820570 A1 11/1999

(Continued)

OTHER PUBLICATIONS

International Search Report, dated Mar. 27, 2007.

(Continued)

*Primary Examiner* — Robert A Siconolfi
*Assistant Examiner* — James Hsiao
(74) *Attorney, Agent, or Firm* — Laurence A. Greenberg; Werner H. Stemer; Ralph E. Locher

(57) ABSTRACT

An energy absorbing element contains a free-flowing medium. The medium is expressed from the element, upon the occurrence of an impact, through at least one opening. The medium is enclosed in a capsule that bursts on impact.

14 Claims, 4 Drawing Sheets

U.S. PATENT DOCUMENTS

| | | | |
|---|---|---|---|
| 7,380,804 B2 * | 6/2008 | Lee | 280/90 |
| 2002/0047295 A1 | 4/2002 | Sullivan et al. | |
| 2003/0102658 A1 | 6/2003 | McCarthy et al. | |
| 2003/0226728 A1 * | 12/2003 | Shimada et al. | 188/267 |
| 2004/0173422 A1 * | 9/2004 | Deshmukh et al. | 188/267.2 |

FOREIGN PATENT DOCUMENTS

| | | |
|---|---|---|
| DE | 10001420 A1 | 7/2001 |
| DE | 69619538 T2 | 8/2002 |
| EP | 0925997 A2 | 6/1999 |
| EP | 1 176 049 A3 | 1/2004 |
| JP | 4818743 | 5/1973 |
| JP | 4828487 | 8/1973 |
| JP | 5112532 | 1/1976 |
| JP | 251175 | 4/1990 |
| JP | 11348792 A | 12/1999 |
| WO | 9321644 A1 | 10/1993 |
| WO | 9958873 A1 | 11/1999 |
| WO | 0037298 A1 | 6/2000 |
| WO | 0192071 A1 | 12/2001 |
| WO | 03033328 A3 | 4/2003 |

OTHER PUBLICATIONS

European Search Report, dated May 29, 2006.
International Search Report dated Apr. 17, 2007.

* cited by examiner

ENERGY ABSORBING ELEMENT

CROSS-REFERENCE TO RELATED APPLICATION

This is a continuation, under 35 U.S.C. §120, of copending international application No. PCT/AT2006/000506, filed Dec. 7, 2006, which designated the United States; this application also claims the priority, under 35 U.S.C. §119, of European patent application No. EP 05 027 070.1, filed Dec. 12, 2005; the prior applications are herewith incorporated by reference in their entirety.

BACKGROUND OF THE INVENTION

Field of the Invention

The invention relates to an energy absorbing element, in particular as part of a device for once-only occupant protection in vehicles, with a flowable medium which, in the event of an impact, is pressed out of the element through at least one orifice.

A device of this generic type, installed in a steering column of a motor vehicle, is known, for example, from U.S. Pat. No. 5,870,930. The steering column has parts capable of being pushed telescopically one in the other, one part being provided with an annular container into which a suitable fluid, for example a flowable silicone, is introduced. The second part has fixed to it a sleeve which penetrates in the manner of a piston into the container and which, in the event of an impact, presses the fluid out through a ring of small orifices. The orifices are covered by an annular bursting element. The orifices generate a counterforce, with the result that part of the impact energy is absorbed.

Devices which absorb impact energy are advantageous or necessary in vehicles not only on the steering column, but also on a series of other components, for example on headrests, safety belts, seats and seat elements, etc. On the extreme, more than twenty different installation locations may be identified in a motor vehicle. A substantial problem in this device is that they are intended solely for once-only use in an emergency and in most cases are not used at all. They should nevertheless remain operable at least for ten years, without their operability and serviceability ever being able to be checked.

In recent years, shock-damping elements with closed piston/cylinder systems have been in increasing use, in which a fluid that changes its viscosity under the influence of an electrical or magnetic field can flow back and forth through overflow orifices in the piston or in the cylinder. The flowability of the medium can be influenced by changing the field. This is very important, since energy absorption can be adapted to different initial states and conditions and there is no need for any mechanically moveable parts. Since neither seals suddenly lose their sealing properties nor moveable parts their ease of movement, wear on the closed piston/cylinder systems can be detected in good time. In this respect, shock dampers which are in constant use differ from impact-damping devices.

SUMMARY OF THE INVENTION

It is accordingly an object of the invention to provide an energy absorbing element, which overcomes the above-mentioned disadvantages of the heretofore-known devices and methods of this general type and which optimizes the operability of an element of the above type.

With the foregoing and other objects in view there is provided, in accordance with the invention, an energy absorbing element, comprising:

a container having a reducible volume and at least one orifice; and a capsule disposed in the container and filled with a flowable medium, the capsule being configured to destruct in an event of an impact that reduces the volume of the container, wherein the flowable medium is pressed out of the container through the at least one orifice in the event of the impact.

The device according to the invention may also be defined as an energy absorbing element assembly having:

an energy absorbing element having a flowable medium and at least one orifice formed adjoining the element;

a capsule containing the flowable medium in the energy absorbing element, the capsule being configured to destruct in an event of an impact, wherein the flowable medium is pressed out of the element through the at least one orifice in the event of the impact.

In other words, the objects of the invention are achieved in that the medium is enclosed in a capsule which, upon impact, opens and, in particular, bursts or explodes. A capsule is understood to mean a container that is closed on itself which can be opened only with particular effort and should and can no longer be closed after opening.

The medium is not simply introduced into a reception space of the element absorbing impact energy, but, instead, a filled sealed capsule is used. The medium, which must, of course, have durability and storability over the period of use, is not subject, in the sealingly closed capsule, to any external influences which could modify the properties.

The above-mentioned electro- or magneto-rheological fluids have these properties. The capsule inserted into the reception space of the impact absorbing element also covers an exit orifice of the reception space through which the medium is pressed out in the event of an impact, so that a bursting disk or another closure for the exit orifice is unnecessary.

The capsule consists, in particular, of a flexible material, such as, for example, a sealed film bag or the like, for example of a plastic or aluminum film, of a coated fabric, of Kevlar® fibers (E. I. du Pont de Nemours and Company), glass fibers, etc.

The novel assembly is particularly suited for integration into a steering column and also in headrests, such as automobile headrests.

Other features which are considered as characteristic for the invention are set forth in the appended claims.

Although the invention is illustrated and described herein as embodied in energy absorbing element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
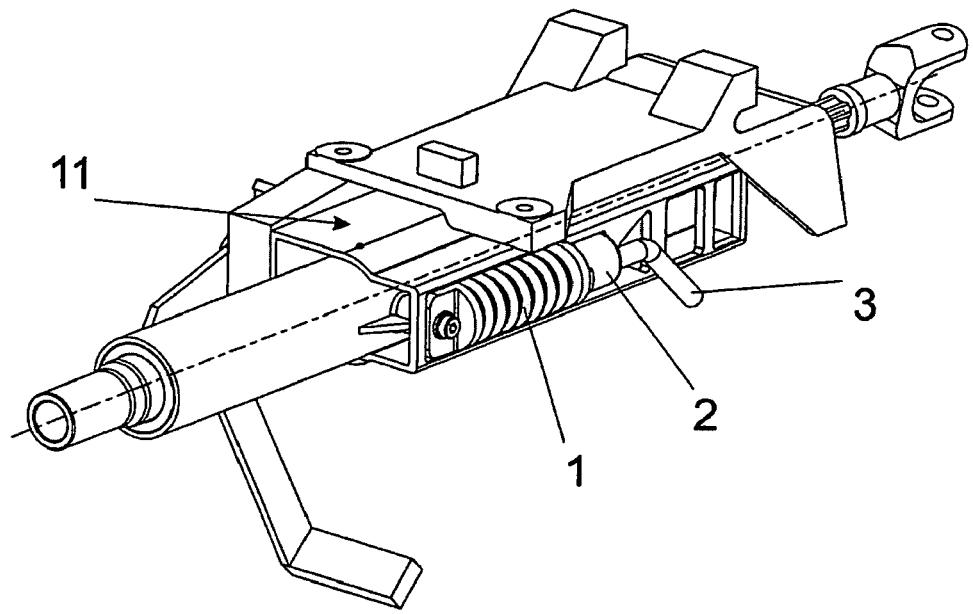
FIG. 1 is a perspective diagram of a detail of a steering column with an element for absorbing impact energy according to the invention.
Figure 2:
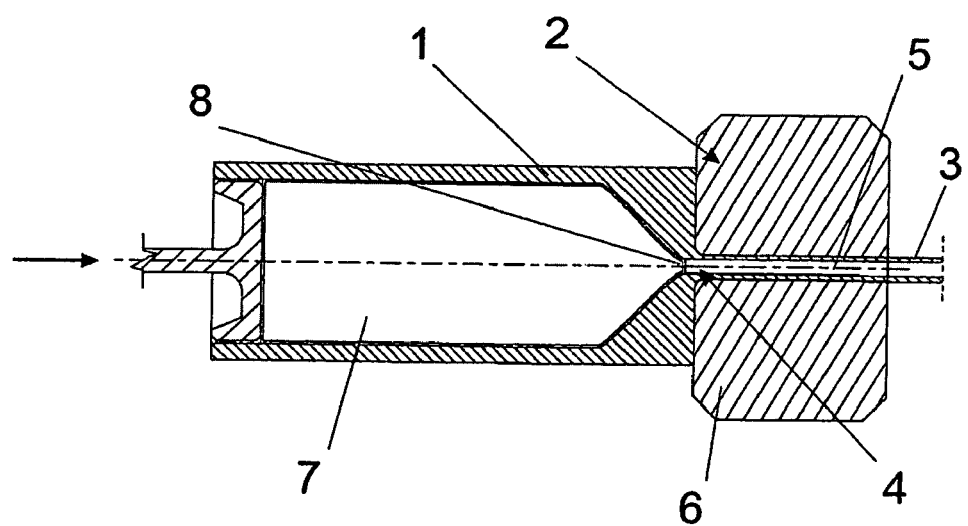
FIG. 2 shows a longitudinal section through the element.

Referring now to the figures of the drawing in detail and first, particularly, to FIG. 1 thereof, the apparatus for absorbing impact energy according to the invention may be provided, for example, on a steering column 11, parallel to the parts of the latter which are longitudinally displaceable in the event of a collision. With further reference to FIG. 2, the device has an element 1, the volume of which can be reduced and into which a fluid-containing capsule 7 is inserted. The element 1 is connected at one end to a displaceable part of the steering column 11, while the other end, which is adjoined by an outflow line 3, is fixed to a nondisplaceable part of the steering column 11. In the event of an impact, the steering column 11 can be shortened, the capsule 7 breaks open or explodes and the fluid contained in the capsule 7 is pressed out through an orifice 4 and an adjoining outlet duct 5 into the outflow line 3, while, at the transition into the outlet duct 5, a counterforce is generated that delays the pressing out of the fluid, so that impact energy is absorbed.

The element 1 is filled with a magneto-rheological fluid and the outlet duct 5 is surrounded by a device 2 for generating a variable magnetic field. The device 2 comprises an electromagnet, via which a magnetic field is generated or the magnetic field of a permanent magnet is influenced. The electromagnet can be activated by signals from sensors, which monitor an impact, as a function of various criteria, such as the weight and sitting position of the driver, etc., the variable magnetic field varying the viscosity of the magneto-rheological fluid to be pressed through the orifice, and the counterforce becoming higher or lower.

Details can be seen more clearly in FIG. 2. The element 1 tapers to a rectangular flat orifice 4 which the outlet duct 5 that issues into the outflow line 3 adjoins. The outlet duct 5 passes through the gap 9 between the pole face of two iron elements 6 to which a coil, not shown, is assigned.

Figure 3:
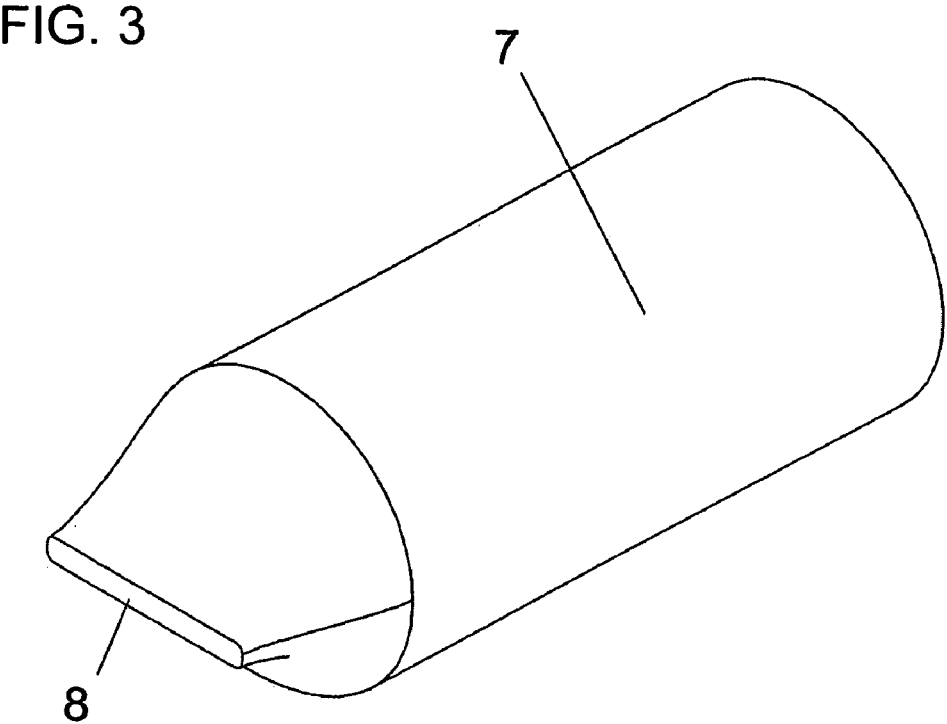
FIG. 3 shows a diagrammatic oblique view of a capsule that is insertible into the element.

FIGS. 1 and 2 show cylindrical elements 1, the assembly according to FIG. 1 being designed in the manner of a concertina and being compressible, and that according to FIG. 2 having a piston. The fluid-containing capsule 7 is flattened toward an edge 8 and is adapted to the shape of the reception space of the element 1, as is clear from FIG. 3. The capsule 7 is therefore inserted into the element 1 such that the flattened edge 8 covers the orifice 4 (FIG. 2).

The capsule 7 is closed sealingly and consists of a material which is compatible with the contents, that is, it is inert with regard to the contents, so as not to modify its properties over the years. It may be formed, for example, by a film bag which, for example, is glued or sealed from a coated fabric. However, the capsule 7 may also be a compressible container or the like of low stability.

If the element absorbing impact energy is installed in a steering column 11, in the event of an accident the volume of the element is reduced due to the impact of the upper body on the steering wheel, the capsule 7 explodes and the device 2 regulates the through flow of the magneto-rheological fluid through the outlet duct 5 by means of a corresponding change in viscosity as a function of signals from a computer which processes various measurement data and parameters. When the element is not in use, the electromagnet is not functional and the medium contained in it has low viscosity. The electromagnet is therefore excited only in the event of an accident, in order to increase and reduce the viscosity of the magneto-rheological medium.

When magneto-rheological fluids are used, a capacitor or a similar charge accumulator that is accommodated, for example, in the steering wheel is sufficient as a current source, and therefore the system remains operable even in the event of a failure of the power supply of the motor vehicle.

Figure 4:
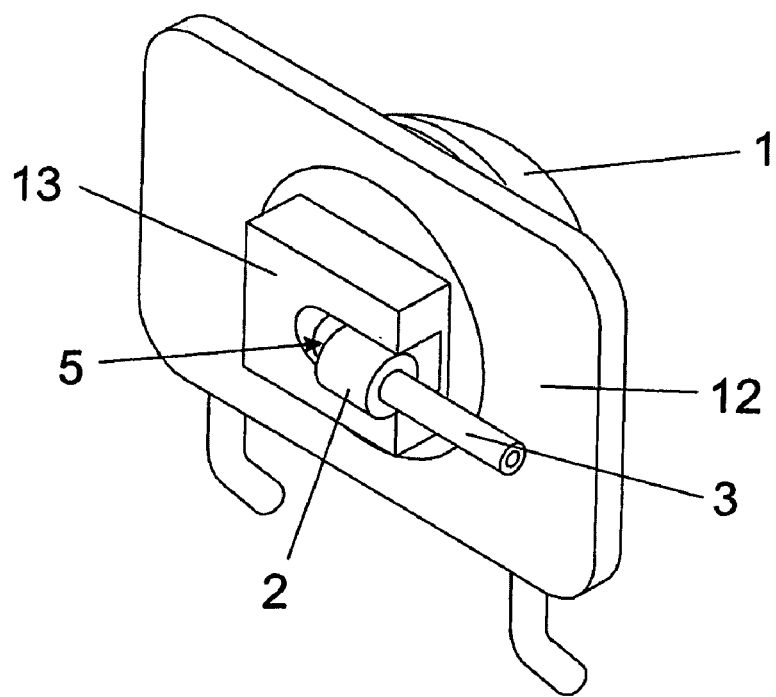
FIG. 4 shows a perspective, diagrammatic illustration of the device according to the invention as part of a headrest with an element absorbing impact energy.

FIG. 4 shows diagrammatically an impact-damping headrest 12. The element 1 is not elongately cylindrical here, but, instead, in the form of a flatter can which can likewise be compressed when a person's head knocks against the headrest 12. In this version, the capsule is of an adapted can-like design. The outlet duct 5 is angled and again is surrounded by the device 2. Electronics via which the device is activated are designated by 13.

The magneto-rheological fluid contained in the capsule 7 comprises, in general, a blend of a basic fluid, for example silicone oil, and iron powder particles. In order to avoid a possible segregation due to unavoidable vibrations, the fluid may contain spheres, swirl bodies or the like for mixing and intermingling. Alternatively, it is also possible to arrange in the capsule 7 an open-celled foam insert, the cells of which absorb the medium in order to prevent segregation.

Figure 5:
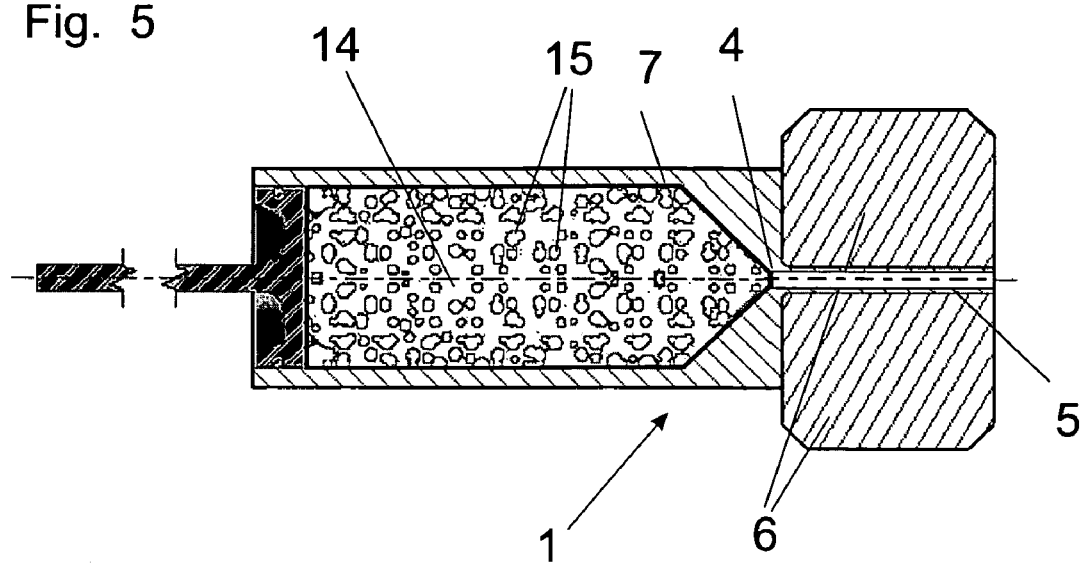
FIG. 5 is a longitudinal section taken through an alternative embodiment of the element.
Figure 6:
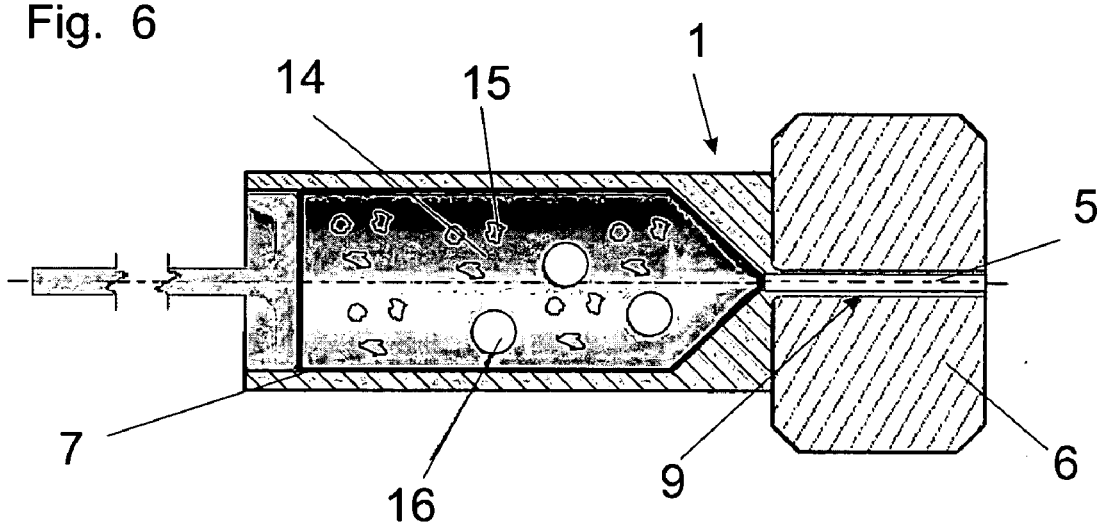
FIG. 6 is a longitudinal section taken through another alternative embodiment of the element.
Figure 7:
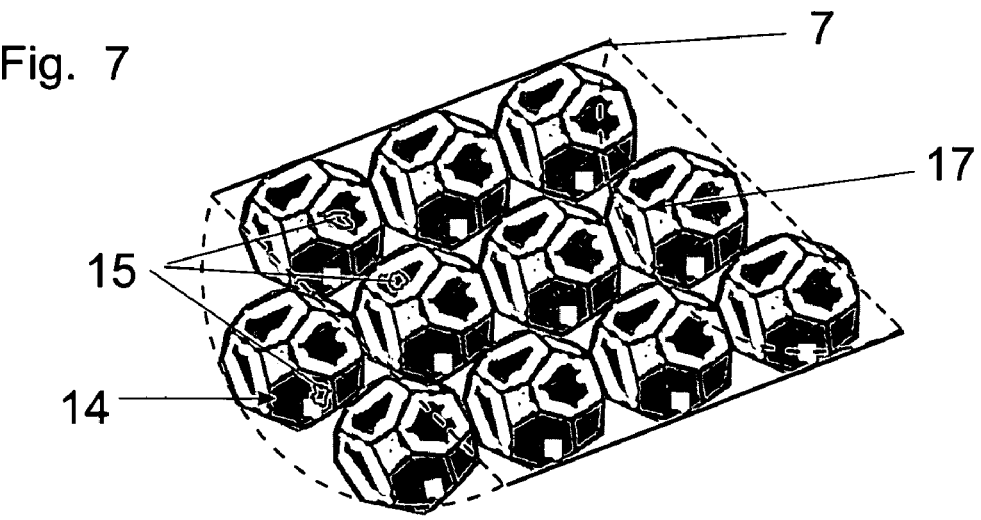
FIG. 7 is a perspective sectional view of a foam insert for the element.
Figure 8:
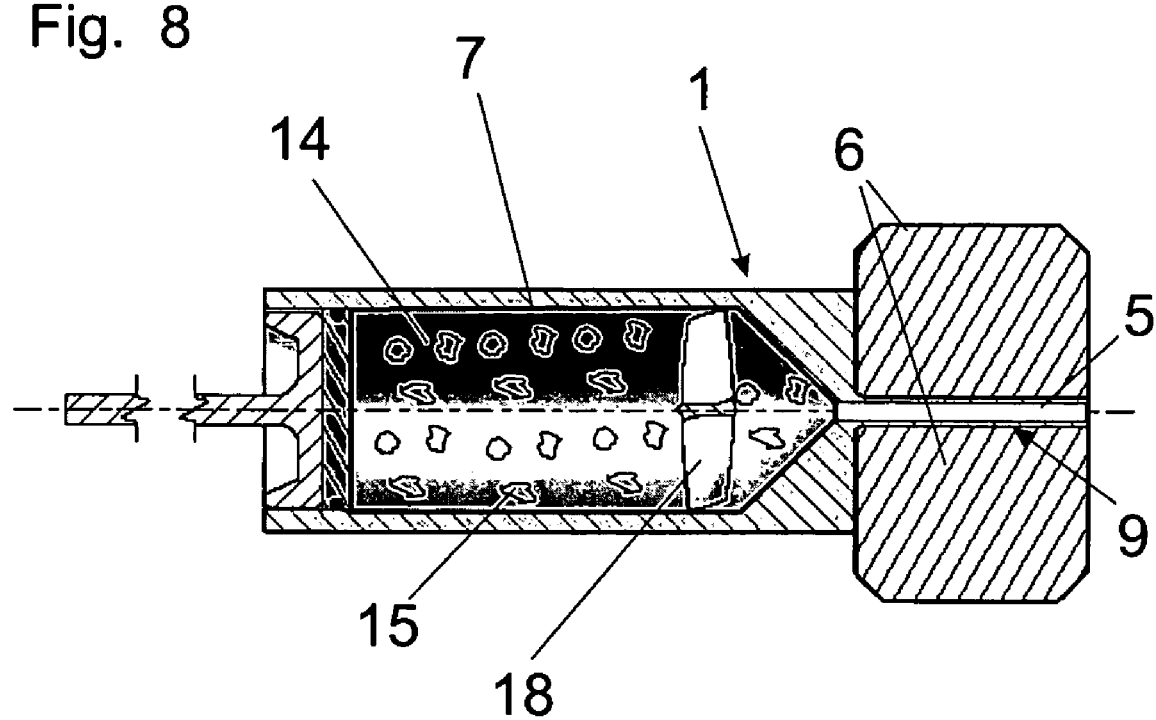
FIG. 8 is a longitudinal section taken through a further alternative embodiment of the element.
Figure 9:
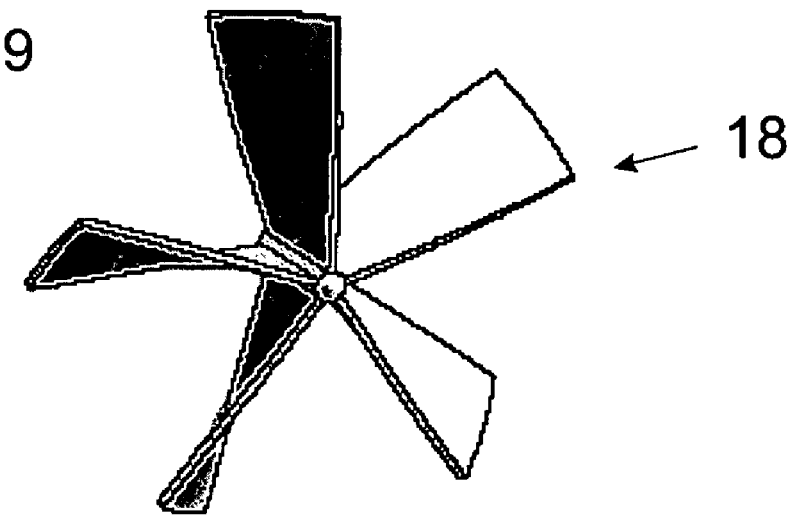
FIG. 9 is a perspective view of an alternative swirl body in the form of a fan or propeller.

FIGS. 5-9 pertain to a variety of additional variations in the exemplary embodiment of the invention. In FIG. 5, the capsule 7 is filled with a flowable medium 14 that contains iron particles 15. The flowable medium 14 in the capsule 7 of FIG. 6, in addition to iron particles 15, further contains spheres 16 forming segregation preventing means. As shown in FIG. 7, the medium 14, with or without iron particles 15, may also be distributed in the open cells of a foam insert 17. Proper mixing and distribution may be assured, prior to the entry into the orifice 5, by one or more swirl bodies 18. Here, an exemplary swirl body 18 is illustrated in FIGS. 8 and 9 in the form of a multi-blade fan. Those of skill in the pertinent art will understand that these mixing and/or segregation preventing means are only exemplary and that many variations fall within the scope of the invention.

The invention claimed is:

1. An energy absorbing element, comprising:
   a container having a movable wall configured to reduce a volume of said container upon being forced into said container, and at least one orifice formed in said container and leading into an adjoining outlet duct having a reduced flow cross-section relative to a cross-section of said container; and
   a capsule disposed in said container and filled with a flowable medium configured to change a flowability thereof under an influence of a magnetic field, said capsule being configured to destruct in an event of an impact that causes said movable wall to move and to reduce said volume of said container, wherein said flowable medium is pressed out of said container through said at least one orifice and through said outlet duct in the event of the impact;

an electromagnet disposed at said outlet duct for generating a magnetic field in said outlet duct and for influencing the flowability of said medium in said outlet duct substantially without affecting a flowability of said flowable medium in said container; and a control unit connected to and controlling said electromagnet, wherein said control unit causes said electromagnet to be energized and to generate the magnetic field in the event of the impact.

2. The assembly according to claim 1, wherein said capsule is formed of a flexible material.

3. The assembly according to claim 1, wherein said capsule is a film bag.

4. A steering column, comprising the impact energy absorbing assembly according to claim 1.

5. A headrest, comprising the energy absorbing assembly according to claim 1.

6. The headrest according to claim 5, configured for and disposed in a motor vehicle.

7. An energy absorbing element, comprising:

a container having a movable wall configured to reduce a volume of said container upon being forced into said container, and at least one orifice formed in said container in a wall other than said movable wall and having a reduced flow cross-section relative to a cross-section of said container; and a sealingly closed capsule, sealingly filled with a flowable medium, disposed in said container;

wherein said capsule is configured to destruct in an event of an impact causing said movable wall to reduce said volume of said container and allow said flowable medium to escape from said capsule and to be pressed out of said container through said at least one orifice in the event of the impact;

an electromagnet disposed to influence a flowability of said flowable medium flowing through said orifice substantially without affecting a flowability of said flowable medium in said container: and a control unit connected to and controlling said electromagnet, wherein said control unit causes said electromagnet to be energized and to generate the magnetic field in the event of the impact.

8. The assembly according to claim 7, wherein said medium is a fluid configured to change a flowability thereof under an influence of a magnetic field and said device is a magnet.

9. The assembly according to claim 8, wherein said medium is a magneto-rheological fluid comprised of a blend of a basic fluid and iron particle powder, and further containing means to prevent segregation.

10. The assembly according to claim 9, wherein said segregation preventing means are spheres or swirl bodies.

11. The assembly according to claim 9, which comprises an open-cell foam insert disposed in said capsule, said foam forming said segregation preventing means.

12. The assembly according to claim 7, wherein said capsule is formed of a flexible material.

13. The assembly according to claim 7, wherein said capsule is a film bag.

14. The assembly according to claim 7, wherein said medium is a magneto-rheological fluid comprised of a blend of a basic fluid and iron particle powder.

* * * * *